(12) United States Patent
Mehra et al.

(10) Patent No.: US 10,231,053 B1
(45) Date of Patent: Mar. 12, 2019

(54) BONE-CONDUCTION HEADSET WITH CROSSTALK CANCELATION FUNCTION

(71) Applicant: Facebook Technologies, LLC, Menlo Park, CA (US)

(72) Inventors: Ravish Mehra, Redmond, WA (US); Antonio John Miller, Sammamish, WA (US)

(73) Assignee: Facebook Technologies, LLC, Menlo Park, CA (US)

( * ) Notice: Subject to any disclaimer, the term of this patent is extended or adjusted under 35 U.S.C. 154(b) by 0 days.

(21) Appl. No.: 15/702,680

(22) Filed: Sep. 12, 2017

Related U.S. Application Data

(60) Provisional application No. 62/433,735, filed on Dec. 13, 2016.

(51) Int. Cl.
| | | |
|---|---|---|
| *H04R 25/00* | (2006.01) | |
| *H04R 3/14* | (2006.01) | |
| *H04R 1/02* | (2006.01) | |
| *H04R 29/00* | (2006.01) | |
| *G02C 11/00* | (2006.01) | |
| *G02B 27/01* | (2006.01) | |

(52) U.S. Cl.
CPC ........... *H04R 3/14* (2013.01); *G02B 27/0176* (2013.01); *G02C 11/10* (2013.01); *H04R 1/028* (2013.01); *H04R 29/00* (2013.01); *G02B 2027/0178* (2013.01); *H04R 2460/13* (2013.01); *H04R 2499/11* (2013.01)

(58) Field of Classification Search
CPC ........ H04R 1/008; H04R 1/1016; H04R 3/14; H04R 25/606; H04R 2225/67; H04R 2460/13; H04R 2499/11; G02B 27/017; G02B 27/0172; G02B 27/0176; G02B 2027/0178; G02C 11/06; G02C 11/10
USPC ..... 381/58, 59, 96, 151, 326, 327, 380, 381; 600/25; 607/55, 56, 57; 73/585
See application file for complete search history.

(56) References Cited

U.S. PATENT DOCUMENTS

| | | | |
|---|---|---|---|
| 8,989,417 B1 * | 3/2015 | Zhong | H04R 5/033 |
| | | | 381/312 |
| 9,324,313 B1 * | 4/2016 | Zhong | H04R 1/028 |
| 9,596,534 B2 * | 3/2017 | Heiman | H04R 1/46 |
| 10,038,966 B1 * | 7/2018 | Mehra | H04S 7/304 |
| 10,070,224 B1 * | 9/2018 | Miller | H04R 3/14 |
| 2013/0156202 A1 * | 6/2013 | Hamacher | H04R 25/453 |
| | | | 381/23.1 |
| 2015/0029091 A1 * | 1/2015 | Nakashima | G02B 27/017 |
| | | | 345/156 |

* cited by examiner

*Primary Examiner* — Xu Mei
(74) *Attorney, Agent, or Firm* — Fenwick & West LLP

(57) ABSTRACT

Embodiments relate to cancelling crosstalk vibrations due to the use of multiple bone conduction transducers by modifying bone conduction signals sent to the bone conduction transducers. The bone conduction signals are modified using an adaptive filter with its coefficients adjusted based on the vibrations generated at a bone conduction transducer and crosstalk vibrations sensed at a vibration sensor assembly. The bone conduction transducer for generating the calibration vibrations and the vibration sensor assembly for detecting the crosstalk vibrations may be placed at opposite sides of the user's head.

18 Claims, 5 Drawing Sheets

BONE-CONDUCTION HEADSET WITH CROSSTALK CANCELATION FUNCTION

CROSS-REFERENCE TO RELATED APPLICATION

This application claims the benefit of and priority to U.S. Provisional Application No. 62/433,735 filed Dec. 13, 2016, which is incorporated by reference herein in its entirety.

BACKGROUND

This disclosure relates generally to a hearing system and specifically relates to a bone conduction hearing system.

Head mounted displays (HMDs) may be used to present virtual and/or augmented information to a user. For example, an augmented reality (AR) headset or a virtual reality (VR) headset can be used to simulate an augmented/virtual reality. Conventionally, a user of the AR/VR headset wears headphones to receive, or otherwise experience, the computer-generated sounds. However, wearing headphones suppresses sound from the real-world environment, which may expose the user to unexpected danger and also unintentionally isolate the user from the environment. Moreover, headphones separated from the outer casing or a strap of the HMD may be aesthetically unpleasing and may also be damaged through use.

Hence, in place of headphones, bone conduction transducers may be used in HMDs. The bone conduction transducers are positioned on the temple or cheek to generate vibrations, sends sound to the internal ear through the cranial bones. The bone conduction transducers can be made compact and be mounted on a strap or leg of the AR/VR headset for convenient use. However, using a pair of bone conductive transducers for both ears may result in crosstalk due to sharing of the user's cranial bone a common medium for transmitting the vibrations.

SUMMARY

Embodiments relate to a head-mounted display (HMD) including a first bone conduction transducer, a second bone conduction transducer, a first vibration sensor, and a bone conduction signal generator. The first bone conduction transducer contacts a user's first patch of skin in a first ear region, and transmits first vibrations responsive to receiving a first bone conduction signal. The second bone conduction transducer contacts the user's second patch of skin in a second ear region, and transmits second vibrations. The first vibration sensor is separated from the first bone conduction transducer and detects crosstalk vibrations responsive to transmitting of the first vibrations. The bone conduction signal generator generates or updates at least one parameter for modifying at least one of a second bone conduction signal for the first bone conduction transducer or a third bone conduction signal for the second bone conduction transducer.

Figure 1A:
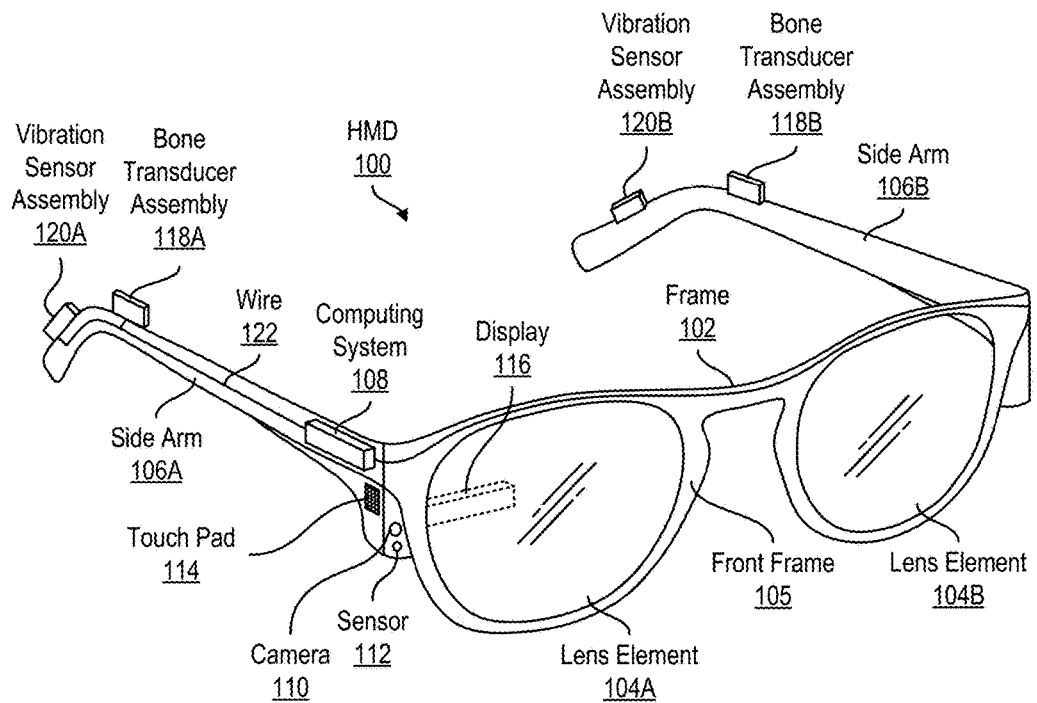
FIG. 1A is a perspective view of a head mounted display including bone transducer assemblies and vibration sensor assemblies, according to one embodiment.

The figures depict embodiments of the present disclosure for purposes of illustration only.

DETAILED DESCRIPTION

Embodiments are described herein with reference to the accompanying drawings. Principles disclosed herein may, however, be embodied in many different forms and should not be construed as being limited to the embodiments set forth herein. In the description, details of well-known features and techniques may be omitted to avoid unnecessarily obscuring the features of the embodiments.

In the drawings, like reference numerals in the drawings denote like elements. The shape, size and regions, and the like, of the drawing may be exaggerated for clarity.

Embodiments relate to cancelling crosstalk vibrations resulting from the use of multiple bone conduction transducers by preprocessing bone conduction signals sent to the bone conduction transducers. The bone conduction signals are modified using an adaptive filter with its coefficients adjusted based on crosstalk vibrations sensed at a vibration sensor assembly. The bone conduction transducer for generating the calibration vibrations and the vibration sensor assembly for detecting the crosstalk vibrations may be placed at opposite sides of the user's head.

Embodiments of the invention may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

Overview of Example System

Figure 1B:
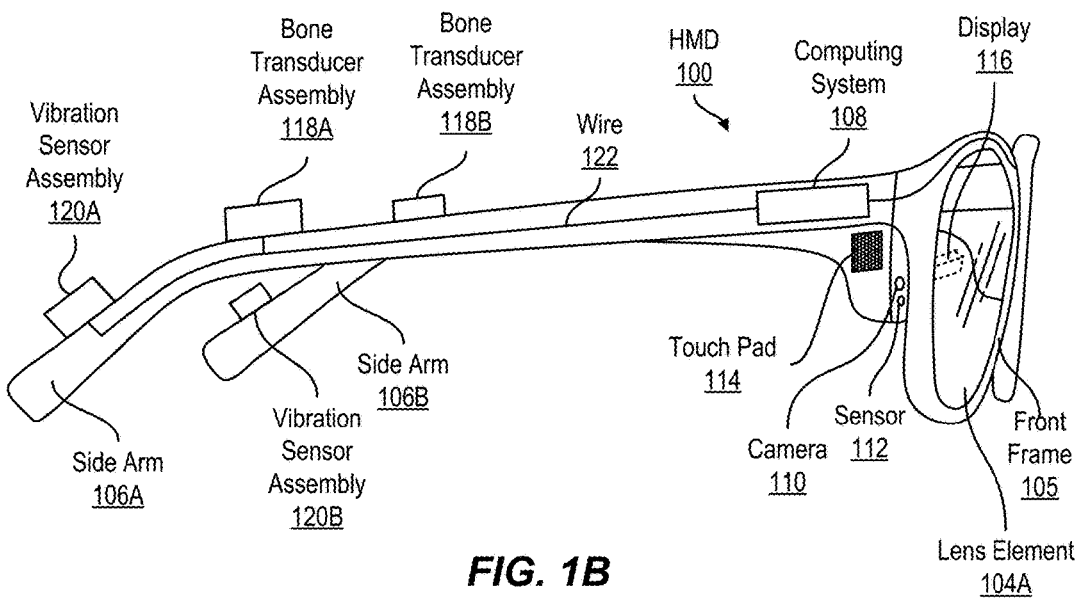
FIG. 1B is a side view of the head mounted display of FIG. 1A, according to one embodiment.

Figure (FIG. 1A illustrates a perspective view of a head mounted display (HMD) 100, according to one embodiment. The HMD 100 includes a frame 102, a computing system 108, a camera 110, a sensor 112, a touch pad 114, a display 116, right and left bone transducer assemblies 118A and 118B (hereinafter collectively referred to as "bone transducer assemblies 118"), and right and left vibration sensor assemblies 120A and 120B (hereinafter collectively referred to as "vibration sensor assemblies 120"). FIG. 1B illustrates a side view of the HMD 100, according to one embodiment.

The frame 102 enables the HMD 100 to be secured to a user's head, more specifically, to a nose and ears of the user. In some configurations, the frame 102 is a solid structure and in other configurations, the frame 102 is a hollow structure (or a combination of solid and hollow structures). The frame 102 includes a front frame 105 securing right and left lens elements 104A and 104B (hereinafter collectively referred to as "lens elements 104") and right and left side arms 106A and 106B (hereinafter collectively referred to as "side arms 106"). The side arms 106 are connected to the front frame 105. When the HMD 100 is worn by the user, the side arms 106 are positioned behind the ears of the user of the HMD 100 and secure the HMD 100 to the user.

The lens elements 104 are made of materials that are at least partially transparent. Such lens elements 104 facilitate the user of the HMD 100 to engage in an augmented reality (AR) environment where a projected image is superimposed over a real-world view as perceived by the user of the HMD 100 through the lens elements 104.

The computing system 108 may be hardware or a combination of hardware and software that performs various computation operations associated with the operation of the HMD 100. The operations performed by the computing system 108 include generating or updating at least one parameter for modifying a bone conduction signal for sending to the bone transducer assembly. The computing system 108 communicates with the bone transducer assemblies 118 and the vibration sensor assemblies 120 over a wired network, for example via a wire 122, or a wireless network (e.g., Bluetooth). As illustrated in FIG. 1A, the computing system 108 is positioned on the right side arm 106A. However, in alternate configurations, the computing system 108 may be on another part of the frame 102 (e.g., on the left side arm 106B), may be inside the frame 102 (e.g., inside the side arms 106), or may be located separate and remote from the HMD 100. The component and functions of the computing system 108 are further described below in detail with reference to FIG. 2.

The camera 110 is configured to capture image and/or videos. The camera 110 has a small form factor. As illustrated in FIG. 1A, the camera 110 is positioned in a front portion of the frame 102 near the right lens element 104A and the right side arm 106A. However, in alternate configurations, the camera 110 may be positioned in another part of the frame 102 (e.g., in a front portion of the frame 102 near the left lens element 104B and the left side arm 106B, in the right side arm 106A, in the left side arm 106B, in a middle portion of the front frame 105, and the like). In one embodiment, the camera 110 may cover a field of view that at least partially overlaps with the user's field of view seen through the lens elements 104.

The sensor 112 detects a position and movement of the HMD 100. The sensor 112 may include one or more of microphones, global positioning systems (GPS) sensors, magnetometers (compasses), gyroscopes, accelerometers, and the like. As illustrated in FIG. 1A, the sensor 112 is positioned in a front portion of the frame 102 near the right lens element 104A and the right side arm 106A. However, in alternate configurations, the sensor 112 may be positioned in another part of the frame 102 (e.g., in a front portion of the frame 102 near the left lens element 104B and the left side arm 106B, in the right side arm 106A, in the left side arm 106B, in a middle portion of the frame 102 between the right side arm 106A and the left side arm 106B, and the like).

The touch pad 114 receives user input associated with the operation of the HMD 100. For instance, the touch pad 114 may sense and resolve position and movement of an object (e.g., a finger of the user of the HMD 100). The touch pad 114 may use resistance sensing, capacitive sensing, surface acoustic wave sensing, pressure sensing, optical sensing, and the like. The touch pad 114 may provide tactile feed to the finger of the user touches the touch pad 114. As illustrated in FIGS. 1A and 1B, the touch pad 114 is positioned in the right side arm 106A. In alternate configurations, the touch pad 114 may be positioned in another part of the frame 102 (e.g., in the left side arm 106B).

The display 116 projects, or otherwise displays, images and/or video to the user of the HMD 100. The display 116 may be a projector, a semi-transparent liquid crystal display (LCD), a light emitting diode (LED) display, an organic LED (OLED) display, and the like. As illustrated in FIG. 1A, the display 116 is inside the right lens element 104A. In alternate configurations, the display 116 may be positioned in another part of the frame 102 (e.g., inside the left lens element 104B). Although a single display 116 is illustrated, the HMD 100 may include additional displays 116. For example, the HMD 100 may include one or more displays 116 inside the right lens element 104A and one or more displays 116 inside the left lens element 104B.

Figure 1C:
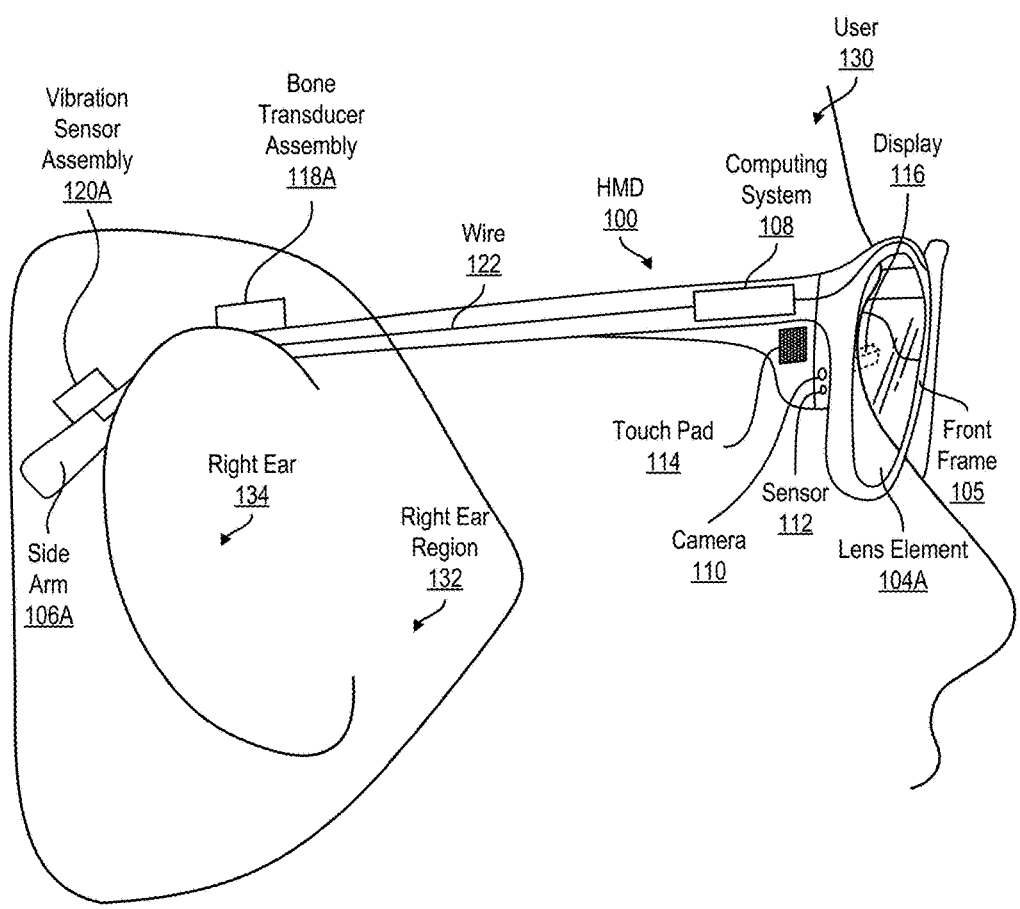
FIG. 1C is a side view of the head mounted display of FIG. 1A on a user, according to one embodiment.

FIG. 1C is a diagram illustrating the placement of HMD 100 when worn by a user 130, according to one embodiment. The HMD 100 is secured to the user 130 by having the side arms 106 resiliently press against a right ear region 132 and a left ear region (not shown) of the user 130. The right ear region 132 includes a right ear 134, a right temporal bone (not shown) surrounding the right ear 134, and a patch of skin covering the right temporal bone. Similarly, the left ear region (not shown) includes a left ear, a left temporal bone surrounding the left ear, and a patch of skin covering the left temporal bone. The temporal bones are situated at a side and base of a skull of the user 130 and house structures of the ears (e.g., middle and inner ear). In one embodiment, the right side arm 106A is positioned behind the right ear 134 of the user 130 and comes into contact with the right ear region 132 of the user 130. Similarly, the left side arm 106B is positioned behind the left ear (not shown) of the user 130 and comes into contact with the left ear region (not shown) of the user 130.

The bone transducer assemblies 118 transmit vibrations to the temporal bones of the user 130. The bone transducer assemblies 118 come into contact with patches of skin of the user 130. Specifically, the right bone transducer assembly 118A comes into contact with a patch of skin covering the right temporal bone in the right ear region 132. Similarly, the left bone transducer assembly 118B comes into contact with a patch of skin covering the left temporal bone in the left ear region. The bone transducer assemblies 118 are further described with respect to FIG. 3A. Although FIG. 1C illustrates the right bone transducer assembly 118A coming into a patch of skin above the right ear 134, the bone transducer assembly 118A can be placed in other regions of the right ear region 132 such as a back of the right ear 134 or a bottom of the right ear 134. Similarly, the left bone transducer assembly 118B can be placed in regions of the left ear region such as a top of a left ear, a back of the left ear, or a bottom of the left ear.

The vibration sensor assemblies 120 come into contact with patches of skin of the user to detect the vibrations resulting from one or both bone transducer assemblies. Specifically, the right vibration sensor assembly 120A comes into contact with a patch of skin covering the temporal bone in right ear region. Similarly, the left vibration sensor assembly 120B comes into contact with a patch of skin covering the temporal bone in left ear region. The vibration sensor assemblies 120 are further described with respect to FIG. 3B.

A vibration sensor assembly (e.g., 120B) at one side is used in conduction with a bone transducer assembly at another side (e.g., 118A) to perform calibration. That is, during a calibration process, vibrations are generated at the bone conduction transducer (e.g., 118A) at one side while detecting the vibration passing through the cranial bones (i.e., crosstalk vibrations) at a vibration sensor assembly (e.g., 120B) of the other side to detect the characteristics of crosstalk vibrations. By determining the correlation of the generated vibrations and the detected vibrations, vibrations can be generated at the bone conduction transducer (e.g., 118B) at the same side as the vibration sensor assembly (e.g., 120B) to cancel out the crosstalk vibrations, as described below in detail with reference to FIG. 4A. Based on the determination, vibrations to cancel out the crosstalk vibrations (i.e., cancellation vibrations) can be added to the vibrations intended for the ear at the same side as the bone conduction transducer (e.g., 118B), as described below in detail with reference to FIG. 4B.

Example Computing System

Figure 2:
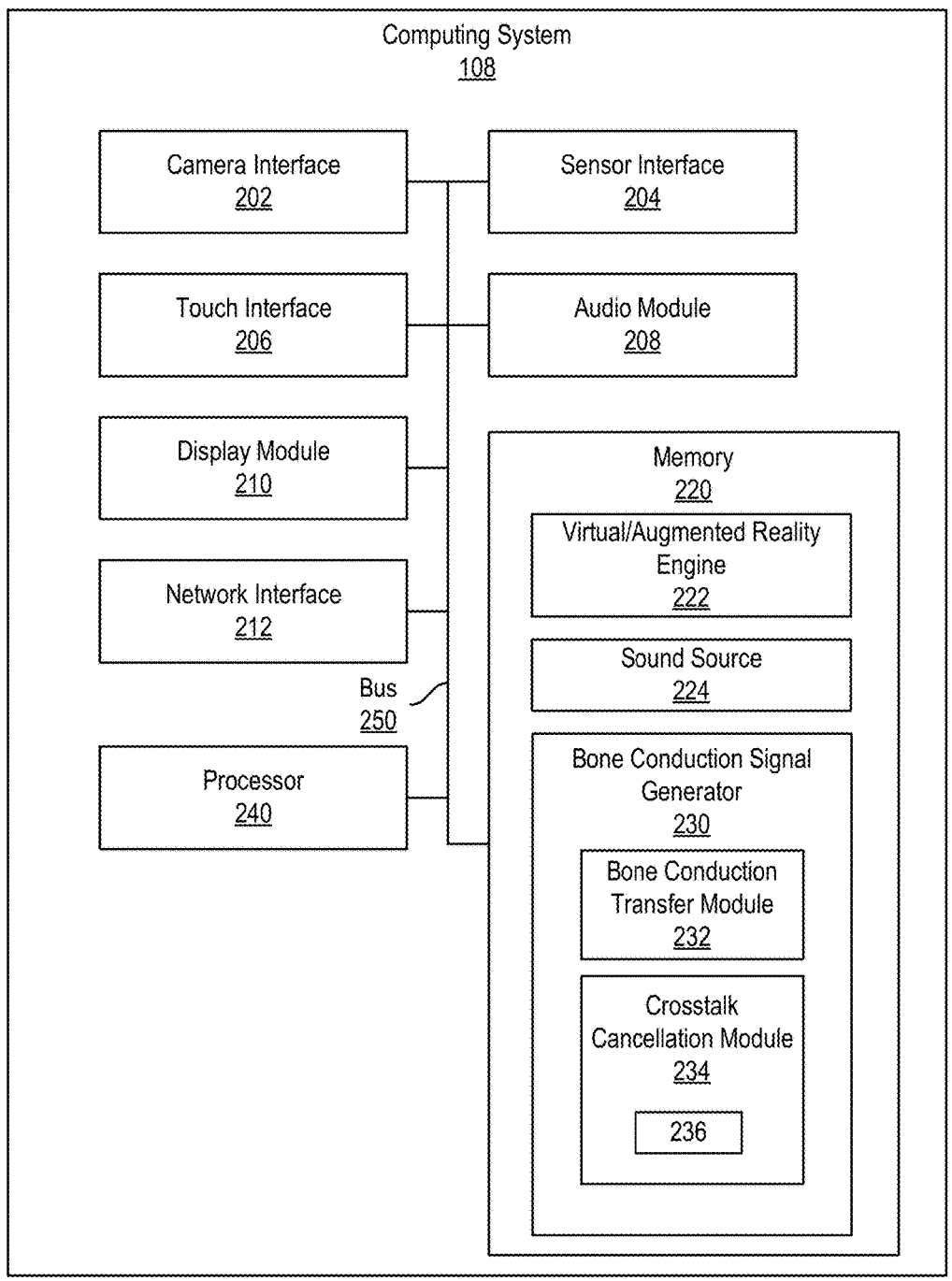
FIG. 2 is a block diagram of a computing system for generating at least one parameter for modifying bone conduction vibrations, according to one embodiment.

FIG. 2 is a block diagram of the computing system 108 for generating at least one parameter for generating bone conduction vibrations, according to one embodiment. The computing system 108 includes, among others, a camera interface 202, a sensor interface 204, a touch interface 206, an audio module 208, a display module 210, a network interface 212, a memory 220, a processor 240, and a bus 250 connecting these components. The processor 240 executes instructions stored in the memory 220.

The camera interface 202 is configured to interface with the camera 110. The camera interface 202 may store images and/or videos captured by the camera 110 in the memory 220. The camera interface 202 may process (e.g., transcode) the images and/or videos captured by the camera 110.

The sensor interface 204 is configured to interface with the sensor 112. The sensor interface 204 may store sensor data corresponding to the position and movement of the HMD 100 detected by the sensor 112 in the memory 220.

The touch interface 206 is configured to interface with the touch pad 114. The touch interface 206 may store sensor data corresponding to user input received by the touch pad 114 and associated with the operation of the HMD 100 in the memory 220.

The audio module 208 is configured to interface with an audio source (e.g., sound source 224) and an audio sink (e.g., bone transducer assemblies 118). The audio module 208 may receive a sound signal from the audio source, process the received sound signal, and transmit the processed sound signal to the audio sink.

The display module 210 is configured to interface with a video source (e.g., virtual/augmented reality engine 222) and a display (e.g., the display 116). The display module 210 may receive a video signal from the video source and may transmit the video signal to the display.

The network interface 212 is configured to communicatively connect the computing system 108 to external systems, such as an audio source, a video source, a reality engine, and the like. The network interface 212 may communicate over the Internet, over a LAN, a WAN, a mobile wired or wireless network, a private network, a virtual private network, or a combination thereof.

The memory 220 is a non-transitory computer-readable storage medium storing, among others, a virtual/augmented reality engine 222, a sound source 224, and a bone conduction signal generator 230. The memory 220 also includes software components not illustrated in FIG. 2 such as an operation system (OS).

The virtual/augmented reality engine 222 generates video data for sending to the display module 210, audio data for sending to the audio module 208 and peripheral data for sending to other user interface devices to provide the sense of virtual or augmented reality to the user. In one embodiment, the virtual/augmented reality engine 222 receives information from the camera via the camera interface 202, the sensors via the sensor interface 204, and the touch pad via the touch interface 208. Based on the received information, the virtual/augmented reality engine 222 determines audio data, video data and peripheral data to be provided to the user of the HMD 100. In a virtual reality scenario, for example, if the HMD 100 detects turning of the user's head to the right or left, the virtual/augmented reality engine 222 generates and sends images corresponding to the right side view or left side view to the display module 210 and correspondingly changed audio data to the audio module 208. In an augmented reality scenario, for example, if the HMD 100 detects that the user looked to the left or right, the virtual/augmented reality engine 222 provides audio and video data to the audio module 208 and the display module 210 that mirrors the user's movement in an augmented environment.

The sound source 224 provides, to the virtual/augmented reality engine 222, a sound signal. The sound source 224 may, for example, be an application program (e.g., gaming program), sound signals detected from the user's environment, audio data received from a remote source via a network interface 212.

The bone conduction signal generator 230 generates bone conduction signals corresponding to a sound signal from the virtual/augmented reality engine 222. The bone conduction signals include vibration signals representing vibrations to be transmitted by the bone transducer assemblies 118. The bone conduction signal generator 230 includes a bone conduction transfer module 232 and a crosstalk cancellation module 234.

The bone conduction transfer module 232 is a software module for generating bone conduction signals that result in stereo or spatial audio when applied to left and right bone transducers 118. In one embodiment, the bone conductive transfer module 232 uses head-related transfer functions (HRTFs) to process the sound signal and generate a right vibration signal for the right bone transducer 118A and a left vibration signal for the left bone transducer 118B. The right and left vibration signals may be digital signals. As a result of processing by the bone conductive transfer module 232, the user of the HMD 100 may perceive the sound (resulting from the vibrations generated by the bone transducers 118) as originating from a certain spatial location. For this purpose, the virtual/augmented reality engine 222 may provide spatial location information indicating a 2D or 3D location from which the user should perceive the sound as being originated.

The crosstalk cancellation module 234 preprocesses the bone conduction signals generated by the bone conduction transfer module 232 to cancel crosstalk. The bone conduction vibrations are provided to the user of the HMD 100 by vibrating cranial bones of the user via the bone transducer assemblies 118. The bone conduction vibrations may include right vibrations intended to be heard ideally only by the user's right ear and left vibrations intended to be heard ideally only by the user's left ear. The right vibrations are generated by the right bone transducer 118A and the left vibrations are generated by the left bone transducer assembly 118B. However, crosstalk occurs between the right vibrations and the left vibrations because both vibrations share the same medium of cranial bones as their path to left and right ears. Due to such crosstalk, some of the right vibrations can be heard by the left ear and some of the left vibrations may be heard by the right ear. Among other issues, such crosstalk makes it difficult for the user of the HMD 100 to localize spatial sound and degrades the overall experience.

The crosstalk cancellation module 234 includes an adaptive filter 236 that filters the bone conduction signals. The adaptive filter 236 may include one or more coefficients (i.e., parameters) that can be adjusted during a calibration process, as described below in detail with reference to FIG. 4A. After the coefficients for the adaptive filters 236 are determined during the calibration process, sound signals for virtual/augmented reality can be processed by the adaptive filter 236 to generate modified bone conducting signals that can be sent to the bone conduction transducer assemblies 118, as described below in detail with respect to FIG. 4B. The crosstalk cancellation module 234 may perform in two separate calibration periods, one for calibrating the right bone transducer assembly and another for calibrating the left bone transducer assembly.

In one embodiment, the same adaptive filter is used for cancelling crosstalk for both the right bone conduction signal and the left bone conduction signal. In other embodiments, separate adaptive filters with different coefficients may be used for the right bone conduction signal and the left bone conduction signal.

Example Bone Transducer Assembly

Figure 3A:
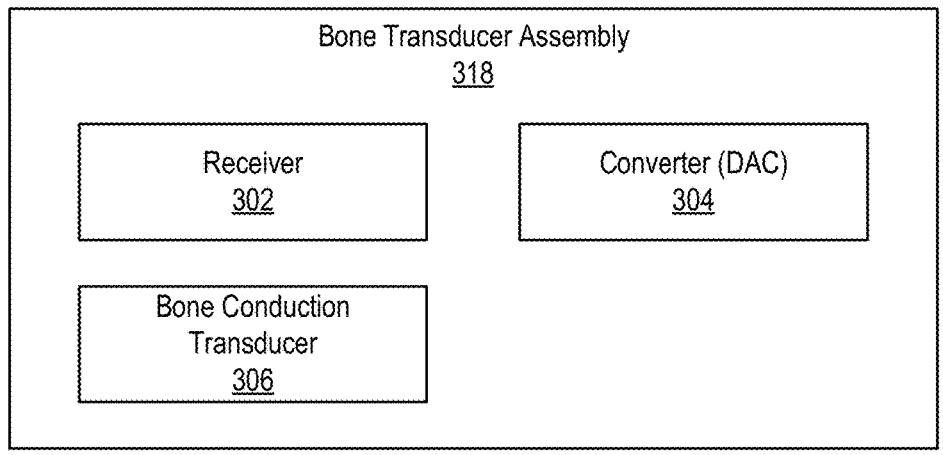
FIG. 3A is a block diagram of a bone transducer assembly, according to one embodiment.

FIG. 3A illustrates a bone transducer assembly 318, according to one embodiment. The bone transducer assembly 318 may include, among other components, a receiver 302, a converter 304, and a bone conduction transducer 306.

The receiver 302 is an interfacing module that receives, from the computing system 108, a vibration signal representing vibrations to be reproduced by the bone conduction transducer 306 using a communication protocol. The communication protocol may be a standard protocol or communication protocol specifically developed for communicating the vibration signal. The vibration signal may be a digital signal.

The converter 304 generates an analog voltage signal corresponding to the vibration signal. The converter 304 may be a digital-to-analog converter. The converter 304 receives the vibration signal in a digital format and converts the signal into an analog signal.

The bone conduction transducer 306 receives the analog voltage signal from the DAC 304 and generates vibrations transmitted to the ears of the user of the HMD 100 via the cranial bones of the user. For this purpose, the bone conduction transducer 306 comes into contact with a patch of skin of the user of the HMD 100.

Example Vibration Sensor Assembly

Figure 3B:
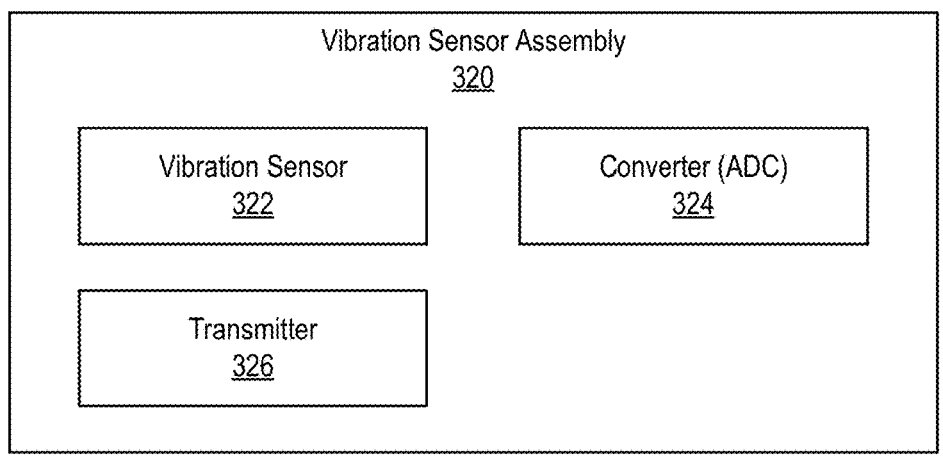
FIG. 3B is a block diagram of a vibration sensor assembly, according to one embodiment.

FIG. 3B illustrates a vibration sensor assembly 320, according to one embodiment. The vibration assembly 320 includes a vibration sensor 322, a converter 324, and a transmitter 326. The vibration sensor assembly 320 detects vibration and sends data on the detected vibration to the computing system 108 for producing a parameter used for generating the vibration signal.

The vibration sensor 322 detects vibrations and generates an analog signal representing the vibrations. The vibration sensor 322 may detect the vibrations responsive to transmitting of vibrations by a bone conduction transducer (e.g., the bone conduction transducer 306). For this purpose, the vibration sensor 322 comes into contact with a patch of skin of the user of the HMD 100.

The converter 324 generates a sensor signal representing the vibrations detected by the vibration sensor 322. The converter 324 may be an analog-to-digital converter to convert analog version of the sensor signal into a digital sensor signal for transmitting to the computing system 108.

The transmitter 326 transmits, to the computing system 108, the sensor signal generated by the converter 324. The transmitter 326 may embody standard or customized communication protocol to communicate the digital sensor signal to the computing system.

Example Bone Conduction Vibration Generation and Crosstalk Cancellation

Figure 4A:
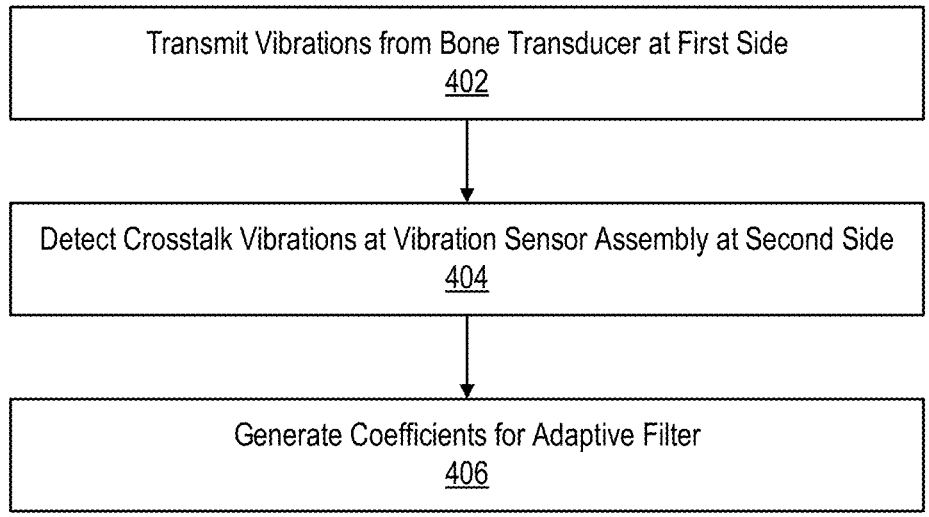
FIG. 4A is a flow chart for generating coefficients for an adaptive filter during a calibration operation, according to one embodiment.

FIG. 4A is a flow chart for generating coefficients for the adaptive filter in the crosstalk cancellation module 234 during a calibration operation, according to one embodiment. The bone conduction signal generator 230 transmits bone conduction signals to a bone transducer assembly (e.g., 118A) at a first side (e.g., right side). As a result, the bone transducer assembly (e.g., 118A) at the first side transmits 402 vibrations.

The transmission of vibrations is not isolated to the first side but also transmits through the user's skull to the second side, resulting in crosstalk vibrations. A vibration sensor assembly (e.g., 120B) at the second side detects 404 the crosstalk vibrations. The vibration sensor assembly transmits the sensed crosstalk vibrations to the computing system 108.

At the crosstalk cancellation module 234 of the computing system 108, coefficients for the adaptive filter is generated based on analysis of the bone conduction signals transmitted from the bone conduction signal generator 230 and the crosstalk vibrations sensed at the vibration sensor assembly (e.g., 120B). By comparing the bone conduction signals and the crosstalk vibrations resulting bone conductions signals, the crosstalk cancellation module 234 generates 406 coefficients for the adaptive filter.

The same process of transmitting 402 vibrations through generating 406 coefficients can be repeated for a number of times, each time with vibrations of different frequency or amplitude characteristics. Moreover, the same process may be repeated with the bone transducer assembly (e.g., 118A) at one side using the crosstalk vibrations detected at the vibration sensor assembly (e.g., 120B) at the opposite side during a first calibration period, and the bone transducer assembly (e.g., 118B) at the other side using the crosstalk vibrations at the opposite side during a second calibration period to obtain the coefficients for the adaptive filter.

The steps of the process as illustrated in FIG. 4A are merely illustrative. For example, vibrations of different characteristics (e.g., pitch) may be generated at both transducer assemblies while detecting the crosstalk vibrations at both vibration sensor assemblies 120. In such a case, the crosstalk cancellation module 234 may use filters to isolate and process crosstalk vibrations of different frequencies that result from different bone transducer assemblies.

Figure 4B:
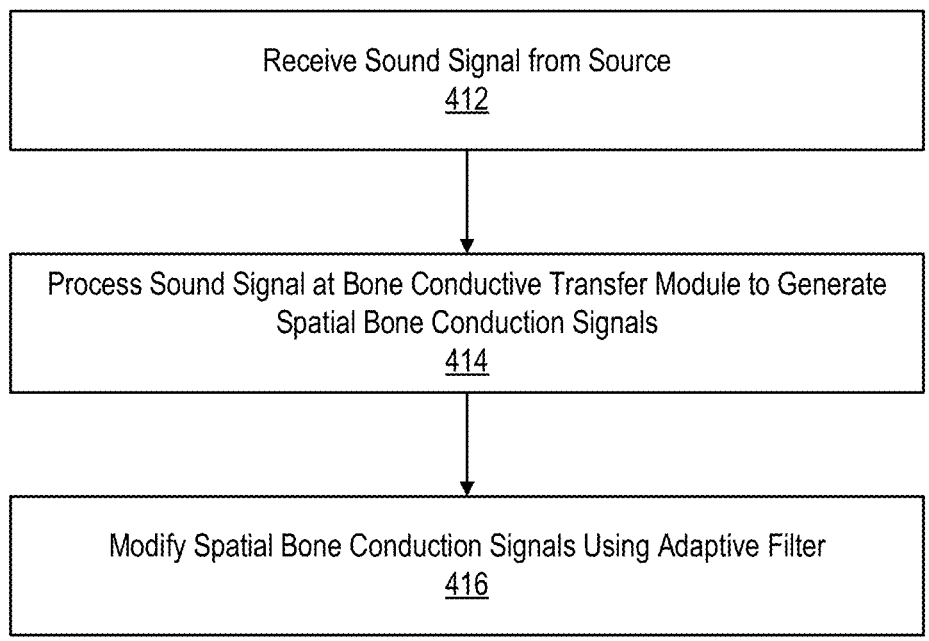
FIG. 4B is a flow chart for processing bone conductive signals by an adaptive filter to cancel crosstalk vibrations, according to one embodiment.

FIG. 4B is a flowchart for generating bone conduction vibrations corresponding to a sound signal at a bone transducer assembly using the adaptive filter, according to one embodiment. The bone conduction transfer module 232 receives 412 a sound signal from the sound source 224.

The bone conduction transfer module 232 processes 414 the sound signal to generate spatial bone conduction signals. In one embodiment, the bone conduction transfer module 232 uses a HRTF or introduces delay/attenuation into the sound signal to generate the spatial bone conduction signals.

The crosstalk cancellation module 234 modifies 416 the spatial bone conduction signals using the adaptive filter. Cancellation signals corresponding to the cancellation vibrations for each side of the ear are generated by passing the spatial bone conduction signals for the other ear through the adaptive filter. The cancellation signals for each side of the ear are then mixed with the spatial bone conduction signals for each side of the ear to generate the modified spatial bone signals. That is, the modified spatial bone conduction signals include signals corresponding to cancellation vibrations to cancel out the crosstalk vibrations. In one embodiment, the modified spatial bone conduction signals for the left bone transducer assembly 118B include signals for cancellation vibrations to cancel out crosstalk vibrations that propagate from the right bone transducer assembly 118A through the cranial bones to the left ear. Similarly, the modified spatial bone conduction signals for the right bone transducer assembly 118A include signals for cancellation vibrations to cancel out crosstalk vibrations that propagate from the left bone transducer assembly 118B through the cranial bones to the right ear.

The modified spatial bone conduction signals are then sent to the bone transducer assemblies 118A and 118B to generate vibrations.

The steps of the process as described in FIG. 4B are merely illustrative. For example, instead of generating spatial bone conduction signals, non-spatial stereo signals can be generated at the bone conductive transfer module. Moreover, the processing 414 of sound signal and the modifying 416 of the spatial bone conduction signals can occur simultaneously instead of occurring sequentially as illustrated in FIG. 4B.

Although the processes of FIGS. 4A and 4B are illustrated as separate processes, these processes can performed simultaneously. That is, the calibration operation illustrated in FIG. 4A may occur simultaneously with the producing of the vibrations as illustrated in FIG. 4B by continuously updating the coefficients of the adaptive filter. Alternatively, the process of calibration as illustrated in FIG. 4A may performed periodically while using the same coefficients between the calibration processes.

What is claimed is:

1. A head-mounted display (HMD) comprising:
a first bone conduction transducer configured to contact a user's first patch of skin in a first ear region, the first bone conduction transducer configured to transmit first vibrations responsive to receiving a first bone conduction signal;
a second bone conduction transducer configured to contact the user's second patch of skin in a second ear region, the second bone conduction transducer configured to transmit second vibrations;
a first vibration sensor separated from the first bone conduction transducer and configured to detect crosstalk vibrations responsive to transmitting of the first vibrations; and
a bone conduction signal generator configured to generate or update at least one parameter for modifying at least one of a second bone conduction signal for the first bone conduction transducer or a third bone conduction signal for the second bone conduction transducer.

2. The HMD of claim 1, wherein the first vibration sensor is configured to contact the second patch of skin.

3. The HMD of claim 1, wherein the bone conduction signal generator comprises an adaptive filter with coefficients, the at least one parameter being one or more of the coefficients of the adaptive filter, and wherein the bone conduction signal generator is further configured to convert a sound signal to the second and third bone conduction signal using the adaptive filter.

4. The HMD of claim 1, further comprising a second vibration sensor separated from the second bone conduction transducer and configured to detect crosstalk vibrations caused by the second vibrations to update at least another parameter for modifying at least one of the second bone conduction signal or the third bone conduction signal.

5. The HMD of claim 4, wherein the second vibration sensor is configured to contact the first patch of skin.

6. The HMD of claim 5, wherein the first vibration sensor detects the crosstalk vibrations caused by the first vibrations during a first calibration period, and the second vibration sensor detects the crosstalk vibrations caused by the second vibrations during a second calibration period subsequent to the first calibration period.

7. The HMD of claim 1, further comprising:
a first side arm contacting the first patch of skin, the first bone conduction transducer and the second vibration sensor mounted on the first side arm; and
a second side arm contacting the second patch of skin, the second bone conduction transducer and the first vibration sensor mounted on the second side arm.

8. The HMD of claim 7, wherein the first bone conduction transducer and the second vibration sensor are spaced apart on the first side arm, and the second bone conduction transducer and the first vibration sensor are spaced apart on the second side arm.

9. The HMD of claim 1, further comprising:
a receiver configured to receive the second bone conduction signal from the bone conduction signal generator, and
a digital-to-analog converter between the receiver and the first bone conduction transducer to convert the bone conduction signal into an analog signal.

10. The HMD of claim 1, wherein the second bone conduction signal and the third bone conduction signal cause generation of spatial sound by the first bone conduction transducer and the second bone conduction transducer.

11. A method of operating a head-mounted display (HMD), comprising:
transmitting first vibrations by a first bone conduction transducer contacting a user's first patch of skin covering the user's first temporal bone in a first ear region responsive to receiving a first bone conduction signal;
transmitting second vibrations by a second bone conduction transducer contact the user's second patch of skin covering the user's second temporal bone in a second ear;
detecting crosstalk vibrations by a first vibration sensor separated from the first bone conduction transducer responsive to transmitting of the first vibrations; and
modifying at least one of a second bone conduction signal for the first bone conduction transducer or a third bone conduction signal for the second bone conduction transducer by generating or updating at least one parameter.

12. The method of claim 11, wherein the first vibration sensor is configured to contact the second patch of skin.

13. The method of claim 11, wherein the at least one parameter is one or more of coefficients of an adaptive filter for modifying at least one of a second bone conduction signal for the first bone conduction transducer or a third bone conduction signal.

14. The method of claim 11, further comprising detecting crosstalk vibrations caused by the second vibrations to update at least another parameter for modifying at least one of the second bone conduction signal or the third bone conduction signal.

15. The method of claim 14, wherein the second vibration sensor is configured to contact the first patch of skin.

16. The method of claim 15, wherein detecting the crosstalk vibrations caused by the first vibrations during a first calibration period, and detecting the crosstalk vibrations caused by the second vibrations during a second calibration period subsequent to the first calibration period.

17. The method of claim 11, further comprising:
 by a receiver, receiving the second bone conduction signal from the bone conduction signal generator, and
 by a digital-to-analog converter, converting the bone conduction signal into an analog signal.

18. The method of claim 11, wherein the second bone conduction signal and the third bone conduction signal cause generation of spatial sound by the first bone conduction transducer and the second bone conduction transducer.

\* \* \* \* \*

UNITED STATES PATENT AND TRADEMARK OFFICE
CERTIFICATE OF CORRECTION

PATENT NO.         : 10,231,053 B1
APPLICATION NO.    : 15/702680
DATED              : March 12, 2019
INVENTOR(S)        : Ravish Mehra and Antonio John Miller It is certified that error appears in the above-identified patent and that said Letters Patent is hereby corrected as shown below:

In the Claims

Column 10, Line 57, Claim 11, delete "contact" and insert --contacting--.

Signed and Sealed this
Twenty-ninth Day of October, 2019

Andrei Iancu
*Director of the United States Patent and Trademark Office*